J. F. HICKS & P. KOVSKY.
AUTOMOBILE LOCK.
APPLICATION FILED JUNE 3, 1913.
1,087,446.
Patented Feb. 17, 1914.
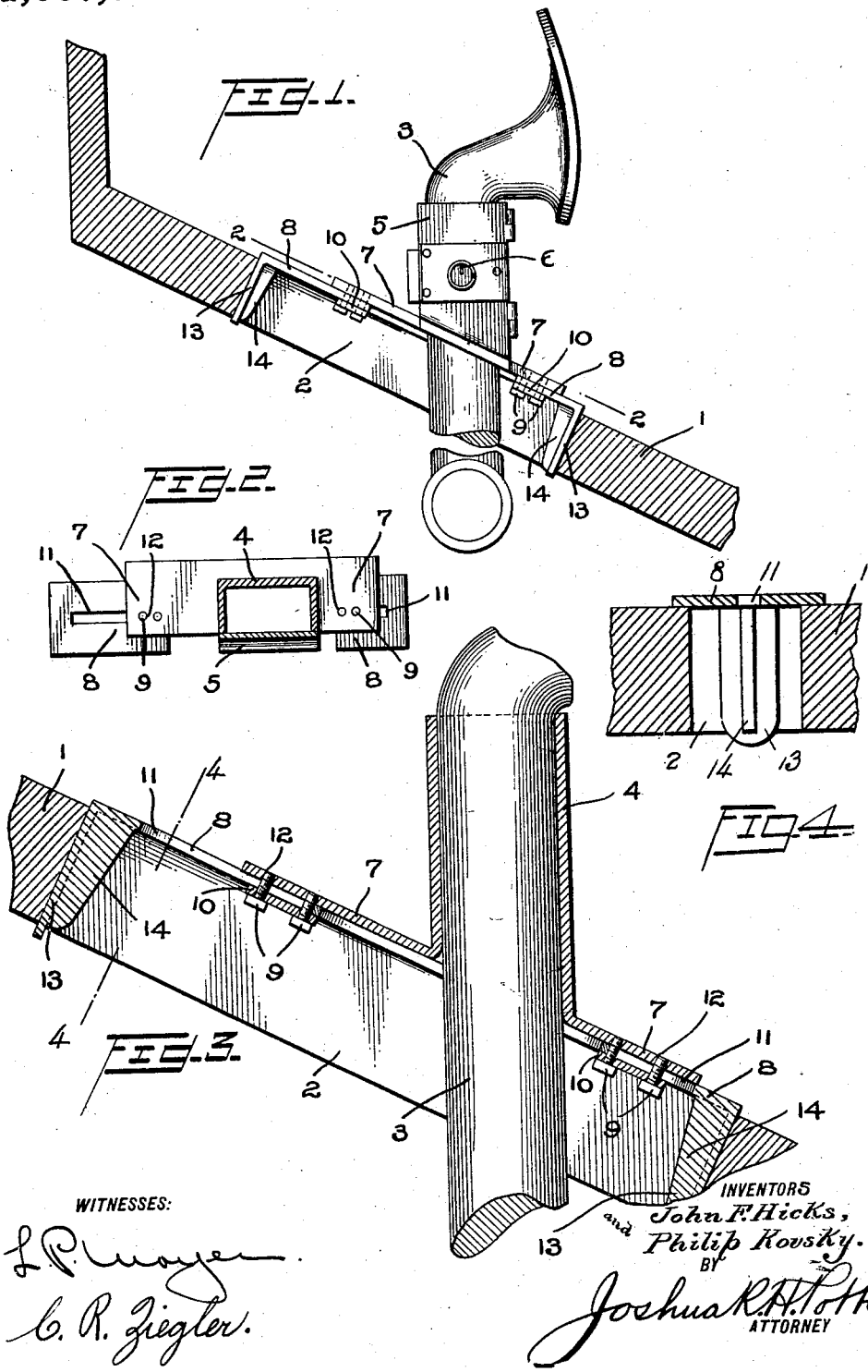

UNITED STATES PATENT OFFICE.

JOHN F. HICKS AND PHILIP KOVSKY, OF PHILADELPHIA, PENNSYLVANIA.

AUTOMOBILE-LOCK.

1,087,446.  Specification of Letters Patent.  Patented Feb. 17, 1914.

Application filed June 3, 1913. Serial No. 771,376.

*To all whom it may concern:*

Be it known that we, JOHN F. HICKS and PHILIP KOVSKY, citizens of the United States, residing at Philadelphia, in the county of Philadelphia and State of Pennsylvania, have invented certain new and useful Improvements in Automobile-Locks, of which the following is a specification.

Our invention relates to improvements in automobile locks, the object of the invention being to provide an improved lock which is adapted to be positioned on the clutch lever of an automobile, and prevent movement of the clutch lever to operate the clutch.

A further object is to provide a device of this character which is designed for use on automobiles in which the clutch lever swings in a slot and provide improved means for engaging the lever and engaging the end walls of the slot to prevent pivotal movement of the lever.

With these and other objects in view, the invention consists in certain novel features of construction and combinations and arrangements of parts as will be more fully hereinafter described and pointed out in the claims.

In the accompanying drawings: Figure 1 is a view illustrating our improvements in elevation in locked position on a clutch lever, the floor of the car through which the lever projects being shown in section. Fig. 2 is a view in section on the line 2—2 of Fig. 1. Fig. 3 is a view in section on an enlarged scale through the lock and the floor, and Fig. 4 is a view in cross section on the line 4—4 of Fig. 3.

1 represents the floor of an automobile having a slot 2 therein in which the clutch lever 3 is movable. Our improved lock which is adapted for use in connection with an automobile having a clutch lever mounted to swing in a slot, comprises a channel shaped casing 4 adapted to fit around the clutch lever 3 above the floor 1, and having a hinged door 5. This door 5 is provided with a lock 6 which is adapted to secure the same in closed position, so that it can be removed only by an authorized person. The casing 4 is provided with base extensions 7 to which extension plates 8 are adjustably secured by screws 9. These screws 9 are projected through openings in clamping plates 10, and through longitudinal slots 11 in extension plates 8, and are screwed into threaded openings 12 in the base 7. At the ends of the extension plates 8, downwardly projecting fingers 13 are provided and are strengthened by webs 14. It is to be understood that the extensions 7 and plates 8 constitute an adjustable base which is adapted to cover the slot 2 in floor 1 with the fingers 13 projecting into the slot and located against the end walls thereof, so that when in this position, the clutch lever 3 is prevented from any possible movement in either direction.

The parts may be adjusted to fit any length of slot, but it is to be understood that after the proper adjustment is had, the screw 9 will be rigidly clamped, so that the device may be readily placed into position without any such adjustment.

Various slight changes might be made in the general form and arrangement of parts described without departing from our invention, and hence we do not limit ourselves to the precise details set forth, but consider ourselves at liberty to make such changes and alterations as fairly fall within the spirit and scope of the appended claims.

Having thus described our invention, what we claim as new and desire to secure by Letters Patent is:

1. A device of the character described, comprising a lever engaging casing adapted to fit around a lever and hold the latter against movement in any direction, devices projecting from opposite sides of the casing and with the casing of a combined length substantially equal to the length of the slot in which the lever moves, and fingers on the ends of said devices adapted to engage the end walls of the said slot, substantially as described.

2. A device of the character described, comprising a casing adapted to be positioned around a lever, base extensions on said casing, plates adjustable longitudinally relative to the base extensions, and fingers on said plates projecting at right angles thereto, substantially as described.

3. A device of the character described, comprising a casing adapted to be positioned around a lever, base extensions on said casing, plates positioned below the base extensions and having longitudinal slots therein, clamping plates below the last-mentioned plates, screws positioned through the clamping plates, through said slots, and screwed into the base extensions, and downwardly projecting fingers on said plates, substantially as described.

4. A device of the character described, comprising a channel shaped casing, a hinged door closing the channel casing, a lock on said door, base extensions on the casing, plates adjustably secured to the base extensions, and downwardly projecting fingers on said plates, substantially as described.

In testimony whereof we have signed our names to this specification in the presence of two subscribing witnesses.

JOHN F. HICKS.
PHILIP KOVSKY.

Witnesses:
M. E. DITTUS,
CHAS. E. POTTS.